US007614893B2

(12) United States Patent
Khodorkovsky et al.

(10) Patent No.: US 7,614,893 B2
(45) Date of Patent: Nov. 10, 2009

(54) CONNECTOR LOCKING LATCH WITH SIGNAL PROVIDING EARLY WARNING OF DISCONNECTION

(75) Inventors: Oleksandr Khodorkovsky, Toronto (CA); Ara Kulidjian, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 0 days.

(21) Appl. No.: 10/907,505

(22) Filed: Apr. 4, 2005

(65) Prior Publication Data

US 2006/0222055 A1 Oct. 5, 2006

(51) Int. Cl.
*G06F 13/00* (2006.01)

(52) U.S. Cl. ....................... 439/188; 710/304; 439/911; 361/679.43

(58) Field of Classification Search ................. 439/489, 439/911, 188; 361/686, 679.41, 679.43; 710/303, 304
See application file for complete search history.

(56) References Cited

U.S. PATENT DOCUMENTS 4,708,661 A 11/1987 Morland et al.
5,077,722 A * 12/1991 Geist et al. .................. 720/657
5,311,397 A * 5/1994 Harshberger et al. ........ 361/683
5,526,493 A * 6/1996 Shu ........................... 710/304
5,805,219 A * 9/1998 Ejima et al. ................. 348/375
5,832,237 A * 11/1998 Lee ........................... 710/303
5,859,970 A * 1/1999 Pleso ......................... 709/250
5,875,307 A * 2/1999 Ma et al. .................... 710/304
5,926,627 A * 7/1999 Sugimura ................... 710/303
5,930,110 A * 7/1999 Nishigaki et al. ........... 361/686
6,175,491 B1 * 1/2001 Park .......................... 361/686
6,185,095 B1 * 2/2001 Helot et al. ................. 361/686
6,297,963 B1 * 10/2001 Fogle ......................... 361/747
6,944,029 B1 * 9/2005 Marcolina et al. ........... 361/754
2004/0257102 A1 * 12/2004 Wong et al. ................. 324/764

* cited by examiner

*Primary Examiner*—Neil Abrams
(74) *Attorney, Agent, or Firm*—Vedder Price P.C.

(57) ABSTRACT

A device and method are provided that generate an early warning disconnect signal from an electrical connector supplying external power to a connected device. The connected device includes an early warning disconnect power management circuit, operational to generate power consumption control information in response to generation of the early warning disconnect signal from the electrical connector. In one example, the electrical connector includes a lock release mechanism and a signaling mechanism, the signaling mechanism is operationally coupled with the lock release mechanism and configured to generate the early warning disconnect signal from the electrical connector to the connected device prior to the lock release mechanism being in an unlocked state.

13 Claims, 5 Drawing Sheets

CONNECTOR LOCKING LATCH WITH SIGNAL PROVIDING EARLY WARNING OF DISCONNECTION

FIELD OF THE INVENTION

The present invention relates generally to electrical connectors and more particularly to electrical connectors providing external power to a portable device, such as a laptop computer or other device.

BACKGROUND OF THE INVENTION

Power cord and cable systems for supplying external power to a device are known to include various assemblies or parts. One end of the cord or cable may be configured with an AC plug for plugging into an AC wall outlet of a building. The electrical cord or cable system may also include an AC/DC power adapter that converts AC power to DC power, e.g. from AC current and voltage to DC current and voltage. The DC end of the electrical cable system may be fitted with an electrical connector adapted to be inserted into a socket or port of a device to provide power to the device.

At least some electrical connectors are configured with a locking mechanism. When the electrical connector is inserted into the receptacle or socket of the device, a locking mechanism latches or locks, thus preventing the electrical connector from inadvertently being disconnected from the device.

At least some devices configured to receive power from an external power supply, such as an AC wall outlet as described above, have an internal power supply, e.g. a battery. Although the battery may supply power to the device when external power is lost, a battery may also provide power when the device is used in a portable fashion. Such portable devices include laptop and/or notebook computers, handheld devices such as cell phones and personal digital assistants, and the like. Users of a portable device may purposely disconnect the device from external power when using the device in a portable fashion. However, problems may arise when disconnecting external power from a portable device that is in use.

A device in use may require some sufficient amount of time after disconnection from an external power supply to ready the internal circuitry of the device for use of an internal battery supply. Sufficient time may be provided by the AC/DC power adapter when a portable device is disconnected from external AC power at the AC wall outlet. The AC/DC power adapter typically has reserve capacitance enabling the adapter to continue supplying DC power to the device for a short interval. However, if the user disconnects the electrical connector at the device interface instead of unplugging the AC wall outlet plug, transfer from external power to internal battery power is immediate. In this case, at least some of the internal circuitry of the device may not have sufficient time to adjust to a lower power consumption mode to make ready for use of the battery. Insufficient current from the internal battery may be supplied to the internal circuits of the device during the time the circuitry is adjusting for use of the internal battery supply. The device may malfunction as a consequence.

For example, when the electrical connector is disconnected at the device, insufficient power or current from the battery may result in a corrupted image being displayed on a screen or LCD panel of the device. The corrupted image may result from a graphics device memory being corrupted due to a lack of sufficient current to the graphics device during adjustment of the graphics device to a lower power consumption level. A lack of sufficient current may result in failure of other device circuits as well. For example, a microprocessor may misinterpret an executable instruction, which may result in an application program, such as an editor, failing.

Although a locking mechanism may be provided with the electrical connector to avoid inadvertent disconnection of the electrical connector from the device, users of portable devices may desire to purposely disconnect the electrical connector from the port and use the device in a non-office location, e.g. a meeting room. As an example, the electrical connector may be configured into a docking station or apparatus that supports quick removal of the device for portable use.

One solution or approach for preventing insufficient current from an internal battery during a power mode adjustment time is to shorten the power mode adjustment time. However, due to inherent latency issues, shortening the power mode adjustment time may not be possible. For example, at least some operating systems are notified through a physical interrupt signal when external power is lost. However, an inherent latency exists for the operating system to service the interrupt and to schedule a software task that, when finally executed as determined by scheduling, lowers the power consumption mode of internal circuits of the device. Accordingly, it may not be possible to significantly shorten the power mode adjustment time required by the internal circuits of the device.

As is known in the art of operating systems, an operating system may prevent usage of a device while the device is being removed. For example, in the case of a DVD drive, a process of unlatching the DVD drive first before removal of the DVD may be required. The unlatching of the DVD drive may signal an operating system of the laptop computer that the DVD drive is about to be removed. Upon being signaled by the unlatching of the DVD drive, the operating system ceases allowing use of the DVD drive. The DVD drive may then be removed without any faults occurring due to software making use of the DVD while the DVD drive is being removed. However, the short transition time available from immediate loss of power to transitioning circuits to a power mode acceptable for receiving battery power would not allow an operating system enough time to be notified and to then notify affected circuitry.

A need exists for providing sufficient time to adjust the internal circuits of a device to a lower power consumption mode when immediately switching the device from an external power supply to an internal battery supply.

DETAILED DESCRIPTION OF THE DRAWINGS

The invention will be more readily understood in view of the following description when accompanied by the below figures and wherein like reference numerals represent like elements:

DETAILED DESCRIPTION OF THE PREFERRED EMBODIMENT

A device and method are provided that generate an early warning disconnect signal from an electrical connector supplying external power to a connected device. The connected device includes an early warning disconnect power management circuit, operational to generate power consumption control information in response to generation of the early warning disconnect signal from the electrical connector. In one example, the electrical connector includes a lock release mechanism and a signaling mechanism, the signaling mechanism is operationally coupled with the lock release mechanism and configured to generate the early warning disconnect signal from the electrical connector to the connected device prior to the lock release mechanism being in an unlocked state. For example, during a depressing of a button or a latch of the electrical connector, the signaling mechanism generates the early warning disconnect signal and the early warning disconnect power management circuit, based on receiving the early warning disconnect signal, generates power consumption control information notifying affected circuitry to begin adjusting power consumption. When having finished depressing the button or the latch of the electrical connector, the electrical connector is then removed, and power for the device is immediately switched from an external power supply to a battery. In this way, sufficient time may be provided for the device circuitry to adjust to a lower power mode, a power mode suitable for use of the battery. The above describes an example of a device and method for generating an early warning disconnect signal from an electrical connector supplying external power to a connected device. Other examples of devices and methods will be apparent to those of ordinary skill in the art.

One of the many advantages of generating an early warning disconnect signal or detecting an early warning disconnect signal is the reduction of faults caused by removing external power from a device, e.g. a laptop computer, such that faults are reduced during the transition from external power to internal battery power. Such faults may cause scrambling of characters on a display screen of the device, blanking of the display screen of the device, and failure of software executing within the device, e.g. an editing program. Another advantage is the reduction of electrical arcing when switching power supplies. In the example of devices that obtain large amounts of current from an external power supply, the switching of power from one power supply to another may produce an electrical arc. Over time, such electrical arcing may wear out and damage electrical contacts and switches. Thus, an early warning of switching of power supplies to devices drawing a large current may provide time for such devices to reduce current being drawn from the power supply before switching to the other power supply, and thus avoid potential electrical arcing.

Figure 1:
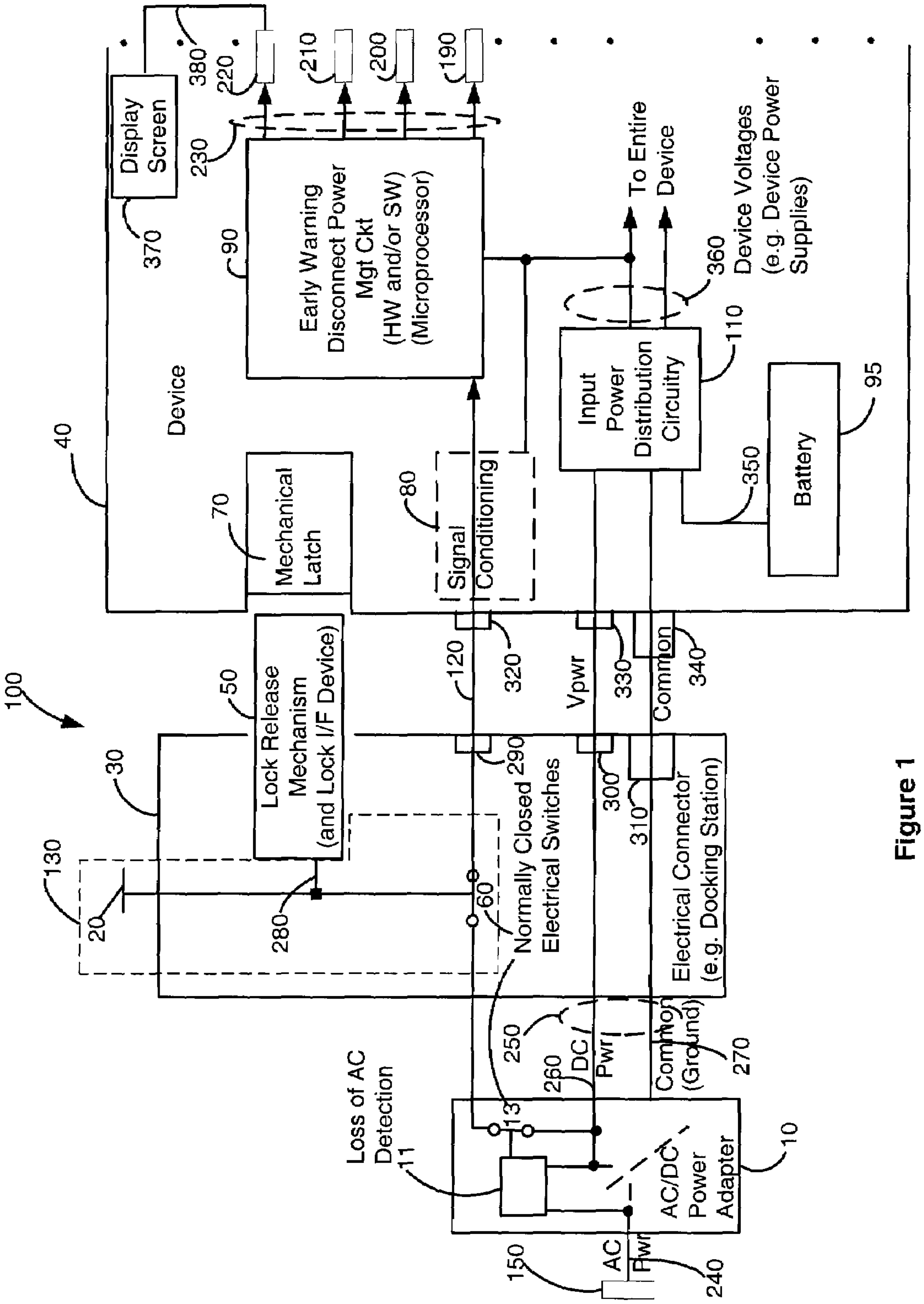
FIG. 1 illustrates a schematic block diagram of one example of a device that includes an electrical connector and a device configured in accordance with an embodiment of the invention.

FIG. 1 is a schematic block diagram of a device 100 that is plugged into an external power supply 150, and includes a device 40, and an electrical connector 30, configured to be connected to the device 40 and the external power supply 150. The word "device" as used herein, may refer to a system or subsystem, a printed circuit board or card, a chip set or chip, or a circuit or any other suitable device that uses a battery and an external power source. As shown in FIG. 1, an AC power cable 240 connects the external power supply 150 to an AC/DC power adapter 10. The AC/DC power adapter 10 converts AC power to DC power, e.g. converts AC current and voltage to DC current and voltage. A DC power cable 250 connects the AC/DC power adapter 10 to the electrical connector 30, thus supplying DC power to the electrical connector 30.

The AC/DC power adapter 10 may include a loss of AC detection 11 and a normally closed electrical switch 13 or any other suitable mechanism. The loss of AC detection 11 upon detecting a loss of AC power from the AC power cable 240 opens the normally closed electrical switch 13 to cause an early warning disconnect signal 120 to be generated. The use of the early warning disconnect signal 120 is described further herein.

The DC power cable 250 includes a DC power line 260 and a common or ground line (pin etc.) 270. When the electrical connector 30 is connected to the device 40, the common or ground line 270 is merely coupled through the electrical connector 30 to an input power distribution circuitry 110 of the device 40. When the electrical connector 30 is connected to the device 40, a connector pin 340 is inserted into a connector pin receptacle 310 and thus provides a path from the electrical connector 30 to the device 40 for the common or ground line 270. Likewise, the DC power line 260 is coupled through the electrical connector 30 to the input power distribution circuitry 110 of device 40 via the insertion of a connector pin 330 into a connector pin receptacle 300 when the electrical connector 30 is connected to the device 40. In this way, DC power is supplied from the DC power cable 250 through the electrical connector 30 to the input power distribution circuitry 110 of the device 40. The input power distribution circuitry 110 is configured to discriminate between receiving power from the external power supply 150, e.g. from the DC power cable 250, or from an internal battery 95 via a battery connection 350 as known in the art.

Typically, the connector pin 340 makes contact with the connector pin receptacle 310 (the common or ground line 270 connected to the device 40) before the connector pin 330 makes contact with the connector pin receptacle 300 (the DC power line 260 connected to the device 40). Accordingly, the electrical connector 30 and the device 40 are brought to a common voltage before DC power is applied to the device 40, thus possibly preventing the need for a more significant amount of protection circuitry for the device 40.

In this example, the electrical connector 30 includes a lock release mechanism 50 and a signaling mechanism 130. The lock release mechanism 50 is configured to, when in a locked state, prevent disconnection of the electrical connector 30 from the device 40 and when in an unlocked state, allow disconnection of the electrical connector 30 from the device 40. The signaling mechanism 130 is operationally coupled with the lock release mechanism 50 and is configured to generate the early warning disconnect signal 120 from the electrical connector 30 to the device 40 prior to the lock release mechanism 50 being in the unlocked state.

The signaling mechanism 130 may include a normally closed electrical switch 60 or any other suitable mechanism. The DC power line 260 may be connected in parallel through the electrical switch 60 (and if the optional switch 13 is provided in the AC/DC power adapter 10, then through the electrical switches 13 and 60) to provide DC power at a connector pin receptacle 290 as well as at the connector pin receptacle 300. Therefore, when the electrical connector 30 is connected to the device 40 and a connector pin 320 is inserted into the connector pin receptacle 290, DC power is supplied to an early warning disconnect power management circuit 90 through a filter or signal conditioning 80 (if desired) of the device 40 as long as the electrical switch 60 is closed (and if the optional switch 13 is provided, as long as both of the electrical switches 13 and 60 are closed). The signal conditioning 80 removes electrostatic charge and conditions the early warning disconnect signal 120 for use by the early warning disconnect power management circuit 90. It will be recognized that the signal conditioning 80 may be provided elsewhere than in the device 40, for example, the signal conditioning 80 may be included in the electrical connector 30. Also in another embodiment, the connector pins 320, 330, and 340 may be connector pin receptacles, and the connector pin receptacles 290, 300, and 310 may be connector pins. Without the optional switch 13 provided, such that the DC path through the AC/DC power adapter 10 to the switch 60 is permanent or fixed, the normal state of the electrical switch 60 may be open or closed. For example, the switch 60 may be normally closed allowing DC current to flow to the early warning disconnect power management circuit 90, or may be normally open not allowing DC current to flow to the early warning disconnect power management circuit 90. Operating or causing the electrical switch 60 to become in the opposite (abnormal) state causes the early warning disconnect signal 120 to be generated.

The lock release mechanism 50 of the electrical connector 30 may include a mechanical latch 70, the mechanical latch 70 being in the locked state when latched and in the unlocked state when unlatched. Alternatively, the mechanical latch 70 may be located in the device 40 and released by the lock release mechanism 50 in response to the lock release mechanism 50 transitioning from the locked state to the unlocked state. It will be recognized that any suitable locking mechanism may be used.

The signaling mechanism 130 includes an operable mechanism, e.g. a push button 20, such that a user may operate the operable mechanism, e.g. push the push button 20, and thus cause generation of the early warning disconnect signal 120 and unlocking of the lock release mechanism 50 at basically the same time if desired or there may be a suitable electrical or mechanical delay between the generation of the early warning disconnect signal and unlocking of the lock. The push button 20 may be implemented in a variety of manners. For example, as illustrated in FIG. 1, the push button 20 may merely be a button or area to push inwards to the electrical connector 30. In another embodiment, the push button 20 may be a hold down finger of the electrical connector 30. In yet another embodiment, the push button 20 may be a mechanism to be depressed inwards to the electrical connector 30 and slid to unlock or lock the electrical connector 30. Thus, for example, a pushing of the push button 20 may cause generation of the early warning disconnect signal 120 and subsequent sliding of the push button 20 may cause unlocking of the lock release mechanism 50. In some embodiments, the push button 20 may, when pushed, allow turning or rotation of the electrical connector 30 to lock or unlock the electrical connector 30. For example, the pushing of the push button 20 may generate the early warning disconnect signal 120 and a subsequent rotation of the electrical connector 30 may unlock the lock release mechanism 50. Suffice it to say that there are numerous configurations and mechanisms for implementing the push button 20 to perform the operation herein. The push button 20 merely provides a user an operable mechanism to operate to cause the generation of the early warning disconnect signal 120 with the subsequent release or unlocking of the lock release mechanism 50. Having unlocked the lock release mechanism 50, the electrical connector 30 may then be disconnected from the device 40.

The pushing of the push button 20 may open or close the electrical switch 60 to cause generation of the early warning disconnect signal 120. The early warning disconnect signal 120 may be a voltage or current, or the lack of a voltage or current at the early warning disconnect power management circuit 90. An operational coupling (electrical or mechanical) may be provided between the signaling mechanism 130 and the lock release mechanism 50 and in this example is shown as a mechanical linkage 280. The mechanical linkage 280 is operated when pushing the push button 20 and when operated, generates the early warning disconnect signal 120 as well as causing the lock release mechanism 50 to be in an unlocked state. As described previously, the electrical connector 30 may be provided as part of an enclosing apparatus, for example, the lock release mechanism 50 and the signaling mechanism 130 may be configured into a portable computer docking station.

The early warning disconnect power management circuit 90 of the device 40 operates to generate power consumption control information 230 in response to generation of the early warning disconnect signal 120 from the electrical connector 30. The early warning disconnect power management circuit 90 may include a microprocessor or any suitable circuitry. Thus, the early warning disconnect power management circuit 90 may include just hardware or may include hardware and software or any suitable combination thereof. The power consumption control information 230 generated from the early warning disconnect power management circuit 90 provides power control signaling to other devices and circuits of the device 40, such as, a clock signal generator 190, a host processor 200 (or co-processor), a memory 210, and a graphics processor 220. The device 40 of FIG. 1 may include a display screen 370, for example. The graphics processor 220 may be connected to the display screen 370 via a display screen connector 380. The clock signal generator 190, the host processor 200, the memory 210, and the graphics processor 220 provide examples of devices or circuits that may adjust (e.g. reduce or increase) their power consumption via voltage reductions, clocking rates, or other mechanisms in response to receiving the power consumption control information 230. For example, the device 40 as an embodiment of a laptop computer may decrease the screen brightness of the display screen 370 when the electrical connector 30 is disconnected from the device 40. Thus the graphics processor 220 may operate in a low power mode, receiving power from the internal battery 95, and decrease brightness at the display screen 370. The clock signal generator 190 may reduce the clocking rate to the host processor 200 to cause the host processor 200 to operate at a slower speed and in a reduced power consumption mode. The memory 210 may also be operated in a reduced power consumption mode upon receiving the power consumption control information 230.

A device voltage 360 supplied from the input power distribution circuitry 110 supplies power, for example DC current and voltage, to the various devices and circuits of the device 40, for example, the devices and circuits 190-220. When operating in a reduced power consumption mode, the devices and circuits 190-200 consume less power and current from the input power distribution circuitry 110. Once the devices and circuits 190-220 are in a reduced power consumption mode, the current and power supplied from the battery 95 through the input power distribution circuitry 110 is sufficient to operate the devices and circuits 190-220.

The FIG. 1 is not meant to provide all the embodiments possible, but only serves as an example embodiment. For example, the electrical connector 30 may be provided as part of an enclosing apparatus, such as a docking station. Also in the embodiment of FIG. 1, the early warning disconnect signal 120 is provided to the signal conditioning 80 when the electrical switch 60 is closed, and yet in an alternative embodiment, may be provided when the electrical switch 60 is open (e.g. lack of current signals the early warning disconnect signal 120). Thus, the early warning disconnect signal 120 may be the presence of a current or voltage or, may be the lack of a current or voltage at the signal conditioning 80.

Figure 2:
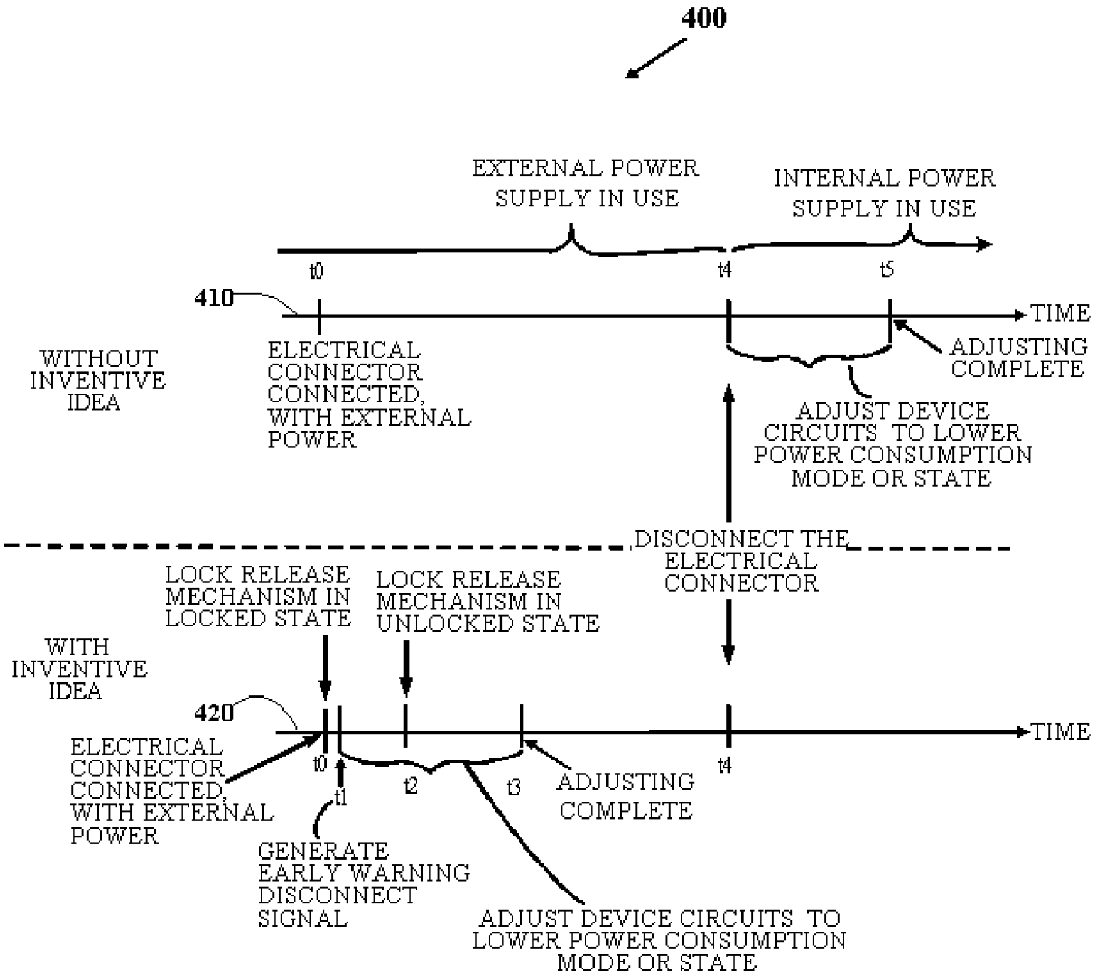
FIG. 2 illustrates a timing diagram showing a sequence of events in accordance with an embodiment of the invention.

FIG. 2 shows a timing diagram 400 that exemplifies operation of the device 100 with and without the inventive idea. A timeline 410 in the upper portion of FIG. 2 shows a sequence of events without the inventive idea. A timeline 420 in the bottom portion of FIG. 2 shows a sequence of events with the inventive idea. Beginning with the timeline 410, at a time t0 the lock release mechanism 50 is in a locked state and the electrical connector 30 and the device 40 are connected. At a time t2, the user unlocks the lock release mechanism 50. At a time t4, the user disconnects the electrical connector 30 from the device 40. At the time t4 when disconnection occurs, a power switch from the external power supply 150 to the internal battery 95 takes place. Also at the time t4, devices and circuits 190-220 begin to adjust to a lower power consumption mode. At a time t5, the adjustment is completed. As shown in FIG. 2, the adjustment completes at the time t5 some amount of time after the time t4 when disconnection of the electrical connector 30 and switching of power supplies occurs. Thus, during the time from t4 to t5, devices and circuits 190-220 are being supplied power from the battery 95. However, since adjustment to a lower power mode is not complete until the time t5, the devices and circuits 190-220 may not have sufficient current to operate correctly. Thus, the devices and circuits 190-220 may malfunction during the time interval between the times t4 and t5. For example, malfunctioning of the graphics processor 220 may result in the display screen 370 going blank or becoming garbled with random characters.

The bottom portion of FIG. 2 shows operation with the inventive idea. Again, at the time t0 the lock release mechanism 50 is in a locked state and the electrical connector 30 is connected to the device 40. At a time t1, the push button 20 is pushed sufficiently to cause the generation of the early warning disconnect signal 120. Subsequent to the time t1, at the time t2, pushing of the push button 20 is complete and the lock release mechanism 50 is unlocked. Once the lock release mechanism 50 is unlocked, the electrical connector 30 may be disconnected from the device 40. As shown in FIG. 2 there is some amount of time (t4-t2) that elapses from the time t2 when the lock release mechanism 50 is released and the time t4 when the disconnection of the electrical connector 30 occurs. Since the adjustment to a lower power consumption mode for the devices and circuits 190-220 begins at the time t1 when the early warning disconnect signal 120 is generated, and completes at a time t3, which is well before the time t4 at which time the electrical connector 30 is disconnected, the issue of insufficient current from the battery 95 for use by the devices and circuits 190-220 does not occur. Thus, the timeline 420 with the early warning disconnect signal 120 allows the devices and circuits 190-220 to completely adjust to a lower power consumption mode and/or reduced clocking rate well before the time t4 at which the electrical connector 30 is disconnected and power supplies are switched.

Figure 3:
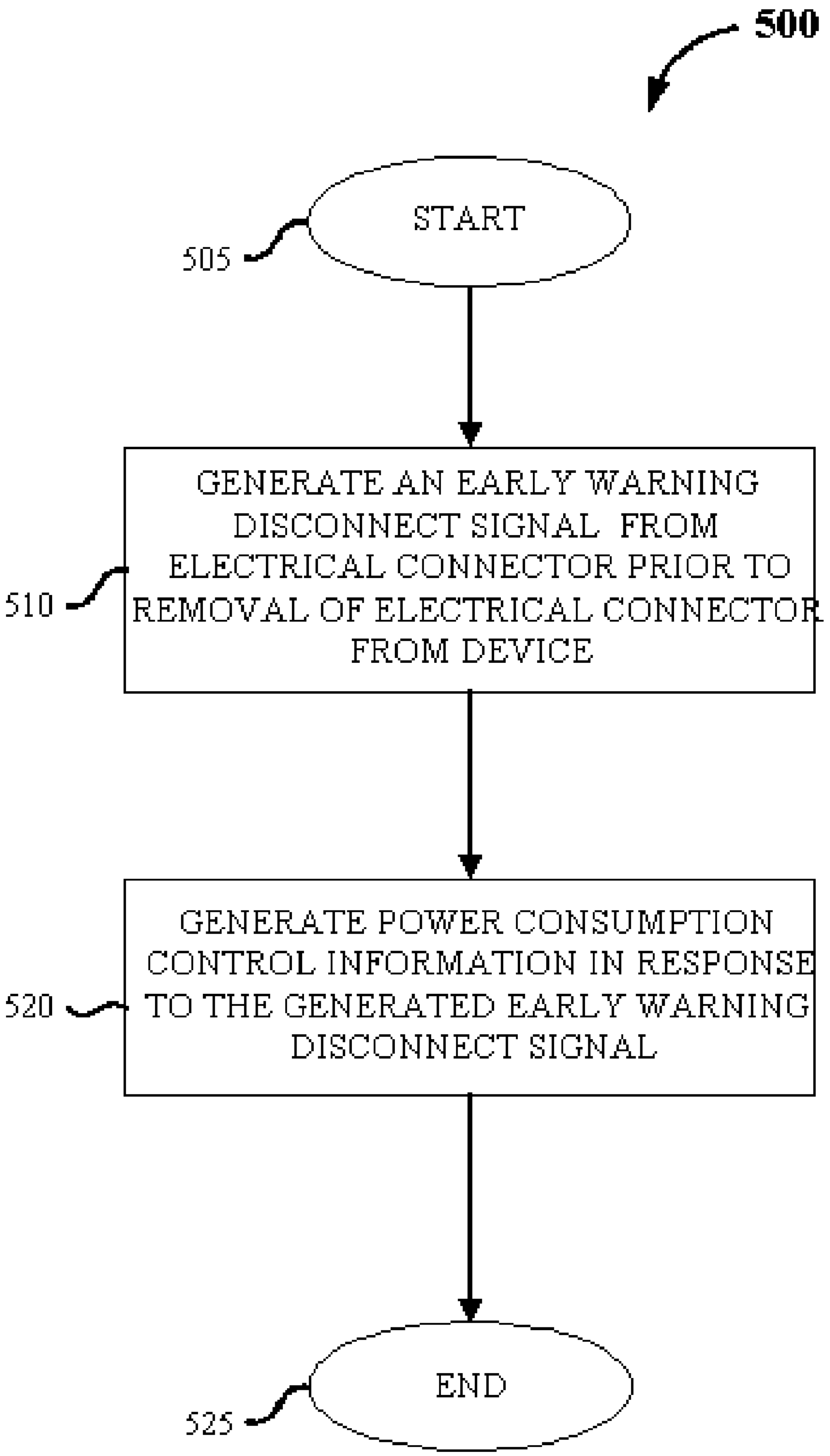
FIG. 3 shows a flowchart describing one example of a method for disconnecting an electrical connector from a device in accordance with an embodiment of the invention.

FIG. 3 is a flowchart illustrating one example of a method 500 for disconnecting the electrical connector 30 from the device 40 in accordance with an embodiment of the invention. The method 500 provides a process for disconnecting the electrical connector 30 from the device 40. The method 500 begins at 505 by plugging the AC power cable 240 into the external power supply 150. As shown in block 510, the method 500 includes generating the early warning disconnect signal 120 from the electrical connector 30 to the device 40 prior to the removal of the electrical connector 30 from the device 40. As shown in block 520, the method 500 includes generating the power consumption control information 230 in response to the generated early warning disconnect signal 120. The generation of the early warning disconnect signal 120 may be in response to the push button 20 of the electrical connector 30 being pushed. As a result of the generation at 520 of the power consumption control information 230, at least one circuit or device of the device 40, e.g. the devices and circuits 190-220, adjust power consumption and/or clocking rate. When power consumption control information 230 is generated at 520, the clock signal generator 190 may reduce the clocking rate for the devices and circuits of the device 40 to operate at a reduced clocking frequency. The method 500 ends at 525 when the devices and circuits 190-220 have completed adjustment of power consumption and are using the power supplied by the battery 95.

Figure 4:
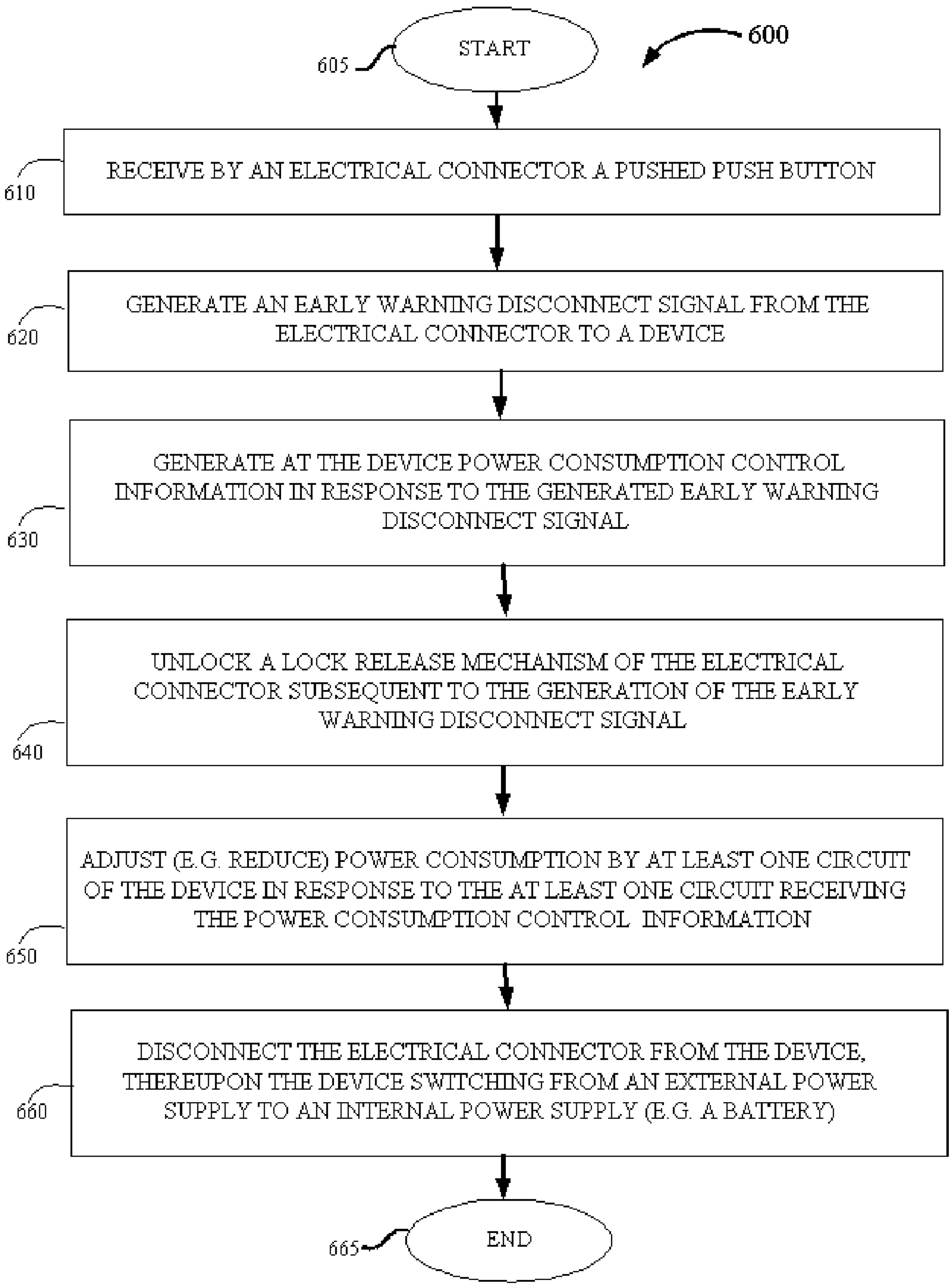
FIG. 4 shows a flowchart describing one example of a more detailed method for disconnecting an electrical connector from a device in accordance with an embodiment of the invention.

FIG. 4 shows a flowchart describing one example of a more detailed method 600 for disconnecting the electrical connector 30 from the device 40 in accordance with an embodiment of the invention. The method begins at 605 by plugging the AC power cable 240 into the external power supply 150. As shown in block 610, the electrical connector 30 receives the pushed push button 20. As shown in block 620, the early warning disconnect signal 120 from the electrical connector 30 to the device 40 is generated. At block 630, the power consumption control information 230 is generated at the device 40 in response to the generated early warning disconnect signal 120. At block 640, the lock release mechanism 50 of the electrical connector 30 is unlocked subsequent to the generation of the early warning disconnect signal 120. Proceeding to block 650, power consumption by at least one circuit or device of the device 40 is adjusted (e.g. reduced) in response to at least one circuit receiving the power consumption control information 230. In some embodiments, the unlocking at the block 640 of the lock release mechanism 50 may occur after the adjusting of power consumption at 650. As shown in block 660, the electrical connector 30 is disconnected from the device 40 upon which the device 40 switches from using the external power supply 150 to using the internal power supply battery 95. The method 600 ends at 665 when the devices and circuits 190-220 have completed adjustment of power consumption and are using the power supplied by the battery 95.

Figure 5:
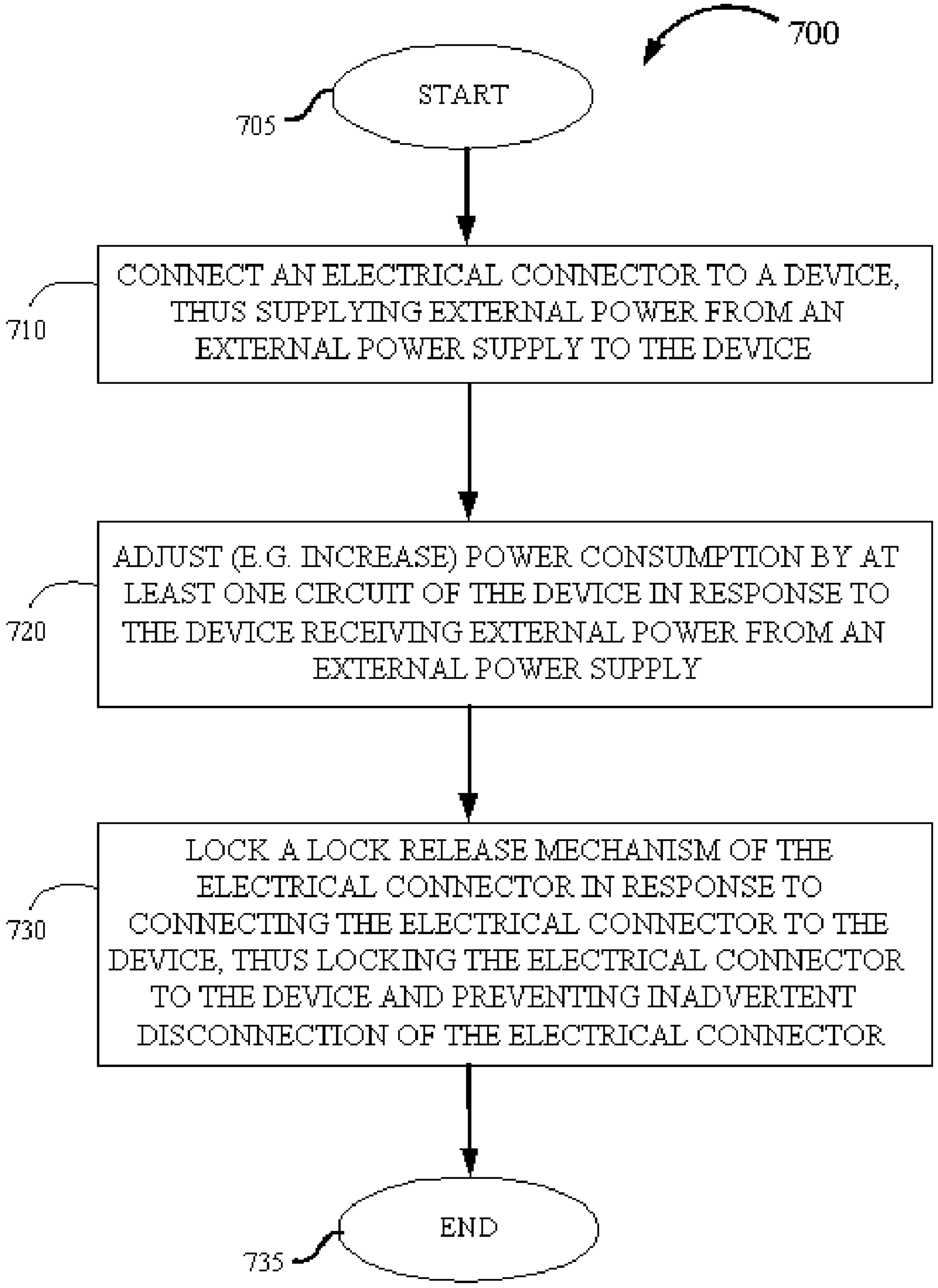
FIG. 5 shows a flowchart describing one example of a method for connecting an electrical connector to a device in accordance with an embodiment of the invention.

FIG. 5 shows a flowchart describing one example of a method 700 for connecting the electrical connector 30 to the device 40 in accordance with an embodiment of the invention. In contrast to FIGS. 3 and 4, which relate to the disconnection of the electrical connector 30 from the device 40, FIG. 5 is related to the connection of the electrical connector 30 to the device 40 whereupon the device 40 again receives power from the external power supply 150. Beginning at 705, the AC power cable 240 is plugged into the external power supply 150 if not already so. As shown in block 710, the electrical connector 30 is connected to the device 40, thus supplying external power from the external power supply 150 to the device 40. At block 720, power consumption by at least one circuit or device of the device 40, e.g. devices and circuits 190-220, is adjusted in response to the at least one circuit or device receiving external power from the external power supply 150. The adjustment of power consumption at the block 720 may include increasing the clocking frequency for the devices and circuits of the device 40 as well as increasing the power consumption. Various embodiments may be implemented in order for such an adjustment to occur.

In one embodiment, an increase of power from the input power distribution circuitry 110 to the early warning disconnect power management circuit 90 may be used to signal connection of the external power supply 150, and to cause the early warning disconnect power management circuit 90 to generate the power consumption control information 230. In an alternative embodiment a current may be supplied through the electrical switch 60 to the early warning disconnect power management circuit 90 indicating that external power from the external power supply 150 is present. In yet another alternative embodiment lack of a current flowing through the electrical contact 60 to the early warning disconnect power management circuit 90 may indicate the presence of external power from the external power supply 150. Or, in yet another embodiment, the presence of external power from the external power supply 150 may be indicated from a combination of the above embodiments.

At block 730, the lock release mechanism 50 of the electrical connector 30 is locked in response to connecting the electrical connector 30 to the device 40. At the block 730, the electrical connector 30 is locked to the device 40 preventing an inadvertent disconnection of the electrical connector 30. The method 700 ends at 735 wherein the devices and circuits 190-220 have completed adjustment of power consumption and are using the power supplied by the external power supply 150, and the lock release mechanism 50 is locked.

It should be apparent to one of common skill in the art that a computing device, e.g. the device 40, may include, but is not limited to, a central processing unit (CPU) and/or processors, system memory, input/output ports and devices, an arithmetic logic unit (ALU), an address generation unit (AU), program control circuitry, interconnecting buses, audio processing circuitry, video processing circuitry, and graphics generating devices.

As illustrated above, one of the many advantages of generating an early warning disconnect signal or detecting an early warning disconnect signal is to reduce faults during the transition from external power to internal battery power. Such faults may cause scrambling of characters on a display screen of the device, blanking of the display screen of the device, and failure of software executing within the device, e.g. an editing program. Another advantage may be to reduce or eliminate electrical arcing when switching power supplies. At least some devices draw large amounts of current from an external power supply, and the switching of power from one power supply to another may produce an electrical arc. Thus, an early warning of switching of power supplies to devices drawing a large current may provide time for such devices to reduce current being drawn from the power supply before switching to the other power supply, and thus avoid potential electrical arcing.

The above detailed description of the invention and the examples described therein have been presented for the purposes of illustration and description only and not by limitation. For example, the operations described may be done in any suitable manner. It is therefore contemplated that the present invention cover any and all modifications, variations or equivalents that fall within the spirit and scope of the basic underlying principles disclosed above and claimed herein.

What is claimed is:

1. A method for disconnecting an electrical connector from a device, comprising the steps of:

generating an early warning disconnect signal from the electrical connector prior to removal of the electrical connector from the device, wherein the electrical connector comprises a single stage lock release mechanism configured, when in a locked state, to prevent disconnection of the electrical connector from the device, and when in an unlocked state, to allow disconnection of the electrical connector from the device;

generating power consumption control information, by an early warning disconnect power management circuit, in response to the generated early warning disconnect signal; and based on the power consumption control information, causing the device to operate in a reduced power consumption mode that when operating in the reduced power consumption mode, the one or more circuits of the device continue to be supplied a current and a power sufficient to operate the one or more circuits.

2. The method according to claim 1, wherein the generating of an early warning disconnect signal is in response to a push button of the electrical connector being pushed.

3. The method according to claim 1, wherein the generating of an early warning disconnect signal is in response to detecting at an AC/DC power adapter a loss of AC power from an external power supply, the AC/DC power adapter connecting the electrical connector to the external power supply.

4. The method according to claim 1, wherein power consumption is adjusted by at least one circuit of the device in response to the at least one circuit receiving the generated power consumption control information.

5. The method according to claim 4, wherein the at least one circuit of the device is a memory, a processor, a clock signal generator or a graphics device.

6. The method according to claim 1, wherein the device, in response to the generation of power consumption control information, operates at a reduced clocking frequency.

7. The method according to claim 1, wherein causing the device to operate in the reduced power consumption mode includes decreasing brightness on a display screen while displaying information.

8. A system, comprising:

an electrical connector comprising a single stage lock release mechanism configured, when in a locked state, to prevent disconnection of the electrical connector from the device, and when in an unlocked state, to allow disconnection of the electrical connector from the device;

an early warning disconnect power management circuit configured to generate power consumption control information in response to a generated early warning disconnect signal, the generated early warning disconnect signal providing advance warning of disconnection of an external power supply supplying power to the device, and the power consumption control information causing the device to operate in a reduced power consumption mode wherein when operating in the reduced power consumption mode, a battery continues to supply the one or more circuits of the device with a current and a power sufficient to operate one or more circuits;

a display screen for displaying visual information; and the battery for supplying internal power to the early warning disconnect power management circuit.

9. The device of claim 8, wherein the electrical connector includes a mechanical latch to lock the electrical connector to the device and thus prevent inadvertent disconnection of the electrical connector from the device.

10. The device of claim 8, wherein the early warning disconnect power management circuit includes a microprocessor.

11. The device of claim 8, further including at least one other circuit, the other circuit adjusting power consumption in response to receiving the power consumption control information.

12. The device of claim 11, wherein the other circuit is a memory, a processor, a clock signal generator or a graphics device.

13. A device comprising:

an electrical connector comprising a single stage lock release mechanism configured, when in a locked state, to prevent disconnection of the electrical connector from the device, and when in an unlocked state, to allow disconnection of the electrical connector from the device; and an early warning disconnect power management circuit configured to generate power consumption control information in response to a generated early warning disconnect signal, the generated early warning disconnect signal providing advance warning of disconnection of an external power supply supplying power to the device, and the power consumption control information causing the device to operate in a reduced power consumption mode, wherein when operating in a reduced power consumption mode, the one or more circuits of the device continue to be supplied with a current and a power sufficient to operate one or more circuits.

* * * * *